July 29, 1930.                    J. H. MILLER                    1,771,504
                    THERMIONIC VALVE TESTING INSTRUMENT
                    Filed March 8, 1926        3 Sheets-Sheet 1

Inventor
John H. Miller
By
Williams, Bradbury,
McCaleb & Hinkle
Attorneys

Patented July 29, 1930

1,771,504

UNITED STATES PATENT OFFICE

JOHN H. MILLER, OF OAK PARK, ILLINOIS, ASSIGNOR TO JEWELL ELECTRICAL INSTRUMENT COMPANY, OF CHICAGO, ILLINOIS, A CORPORATION OF ILLINOIS

THERMIONIC-VALVE-TESTING INSTRUMENT

Application filed March 8, 1926. Serial No. 92,990.

The present invention relates to thermionic valve testing instruments, and aims generally to provide an improved instrument and an improved method for testing thermionic valves. I have employed the generic term "thermionic valve" to signify that the present invention has application to the testing of thermionic valves, vacuum tubes or audions of all types, whether they are designed for radio work, telephone repeaters, relays or any other use.

The majority of all prior thermionic valve testing instruments with which I am familiar have operated on the theory of giving certain values of the valve or tube under certain conditions, such as plate current, plate voltage, grid voltage, etc., from which values the characteristic or characteristics of the valve or tube had to be determined by a mathematical calculation. This involves the solving of a mathematical equation for each characteristic of the tube. Thus it necessitates in the first instance knowing the fractional equation, next, writing down the values in this equation, and finally solving the equation. The necessity of going through these steps or mathematical calculations has been a decided detriment to these prior tube testing instruments. Many radio dealers have no knowledge as to how to arrive at the tube characteristics by these equations and even when the method of making these calculations is known, the time and trouble involved in such calculations is enough to prevent extensive sale and use of the instrument.

Other thermionic valve testing instruments have operated on the dynamic balance principle of operation, in which a click or some other audible sound enters into the performance of the test. These instruments are thus subject to the additional objection of human error in hearing this critical testing sound.

With the view to overcoming the deficiencies in all of these prior testing instruments, it has been my principal object in developing the present invention to provide a device which will indicate the characteristic of the tube by a direct reading indication on the face of the instrument. All tubes are tested for operating efficiency, for amplifying properties, and for general performance in association with other radio units, by the determination of three primary characterisitcs of the tube, to-wit, (1) mutual conductance, (2) plate resistance (otherwise termed plate impedance), and (3) amplification constant. These three primary characteristics are represented by or obtained from the following equations:

(1) Mutual conductance $= \dfrac{\text{Change in plate current}}{\text{Change in grid voltage}}$ (2) Plate resistance $= \dfrac{\text{Change in plate voltage}}{\text{Change in plate current}}$ (3) Amplification constant $= \dfrac{\text{Change in plate voltage}}{\text{Change in grid voltage}}$ It is a further object of my invention to provide a radio tube testing instrument which will indicate each of these primary characteristics by a direct reading on the face of the instrument, so that each of these characteristics can be quickly determined without any calculation whatever and without the possibilities of error which the necessity of calculation introduces in finding these values.

The invention also embodies numerous other features which will be described at length in the following detailed description. Among these additional features are: Improved means for nullifying or cancelling a normal plate circuit flow through the plate milliammeter to reset this milliammeter to zero; an improved double potentiometer for floating or connecting a C-battery or other grid bias in the grid circuit; improved means for adjusting the plate voltage in association with a meter connected to this means for indicating the voltage change in terms of tube characteristics, etc.

In the accompanying drawings illustrating a preferred embodiment of my invention.

In the following description, I shall refer to certain specific values which have been given to different resistances, etc., and to different values which have been made the basis of calibration for certain parts of the instrument but it is to be understood that these values are largely relative and that they can be varied without departing from the essence of the invention. The particular values that I have given these resistances, meter calibrations, etc., have been found preferable for tubes of the types now being manufactured.

All of the parts of the instrument are preferably contained in the flat rectangular cabinet 10, the top of which is closed by a panel top 11 of insulating material. In securing this panel top to the cabinet, four posts 12 extend down from the underside of the panel at the corners thereof, and screws (not shown) pass up through the bottom of the cabinet and tap into these posts. The various meters, controls, and terminals are all mounted on the panel 11 either above or below the same, so that all of the operating parts of the instrument can be removed as a unit assembly by lifting the panel top from the cabinet. This affords ready accessibility to the parts mounted on the underside of the panel.

Mounted along the upper edge of the panel are six binding posts or terminals for making connection to the different sources of current supply for the instrument. The two left hand terminals 14 and 15 are marked A+ and A— for making connection to the source of filament supply which is generally a so-called A battery or three cell storage battery. The two center posts 16 and 17 are marked "B+" and "B—" for making connection to the source of plate circuit supply which is generally a so-called B-battery or a battery of relatively high voltage. The two right hand terminals 18 and 19 are marked "C+" and "C—" for making connection to the source of grid bias, which is generally a so-called C-battery, preferably a battery of approximately 22½ volts, when testing ordinary radio tubes.

Directly below these binding posts or supply terminals is a tube socket 21 of any standard construction having the usual contact terminals F+, F—, P and G for making contact with the four prong contacts on the base of the standard tube. Preferably, this socket is of the type for receiving five volt tubes; other tubes such as the three volt size can be tested in this same socket through the use of an adapter.

Directly below this tube socket is mounted a filament rheostat 22 for varying the potential applied to the filament of the tube.

This potential is indicated on a meter 23, shown as disposed to the left of the tube socket 21. This meter 23 is also arranged for indicating the plate supply voltage and the filament amperage. The meter normally indicates the filament voltage as set by the rheostat 22, and the shift for indicating filament amperage and plate voltage is effected through two push buttons 24 and 25 which are located directly to one side of this meter. The pressing of the upper push button 24 shifts the connections of the meter so that it indicates filament amperage, and the pressing of the lower button shifts the connections of the meter to indicate plate voltage. These electric connections will be hereinafter described in connection with the description of the circuit connections for the entire instrument.

On the other side of the tube socket is disposed a grid volt meter 26 arranged to read to either side of its zero mark for indicating either, a positive or a negative grid bias. A grid potentiometer 27 is disposed in the lower center of the panel for varying the grid bias, which variation is indicated on the grid volt meter 26.

The potentiometer 27 may be termed a "double potentiometer", and by this term I mean a potentiometer capable of supplying a range of potential varying from a minus value through zero to a plus value without reversing or disconnecting terminals. One form of such a potentiometer is described herein.

Below the two upper meters just described are two relatively large face meters 28 and 29. The meter 28 is a milliammeter for measuring plate circuit current flow, this meter being also calibrated for indicating the mutual conductance of the tube in micromhos. The other meter 29 is fundamentally a volt meter which is calibrated to indicate on one scale the amplification constant of the tube and on another scale the plate resistance of the tube. The expression "plate resistance" and "plate impedance" are now used almost interchangeably in speaking of the self-same characteristic in a vacuum tube, and it will be understood that in my further usage of the term "plate resistance" I mean the same characteristic which is often expressed as "plate impedance".

A "reset" potentiometer 31 is disposed to one side of the meter 28 for resetting this meter to zero reading, this reset potentiometer coming into operation in the testing of a tube for cancelling or nullifying the indication of a previously existing plate circuit flow when making a certain test.

A "plate" potentiometer 32 is disposed to one side of the other meter 29. This plate potentiometer is effective to vary plate voltage, and thereby vary the plate current indicated on the meter 28. The meter 29 is connected to this potentiometer 32 to indicate the voltage drop across one leg or portion of this potentiometer, this meter 29 being calibrated to indicate this voltage in terms of amplification constant and plate resistance as previously described.

Along one edge of the panel is disposed a group of four push buttons 33 to 36 inclusive. The first two push buttons are marked "A. C. 3V." and "A. C. 5V.", these push buttons being operated for determining the amplification constant of a three volt tube and a five volt tube respectively. The two lower buttons are marked "M. C. 3V." and "M. C. 5V.", these buttons being pressed for indicating the mutual conductance of a three volt tube and a five volt tube respectively.

Directly below the milliammeter 28 is a push button 37 marked "20 M. A." which is effective to place a shunt across the milliammeter to raise its scale readings from two milliamperes as a maximum to twenty milliamperes as a maximum.

Figure 6:
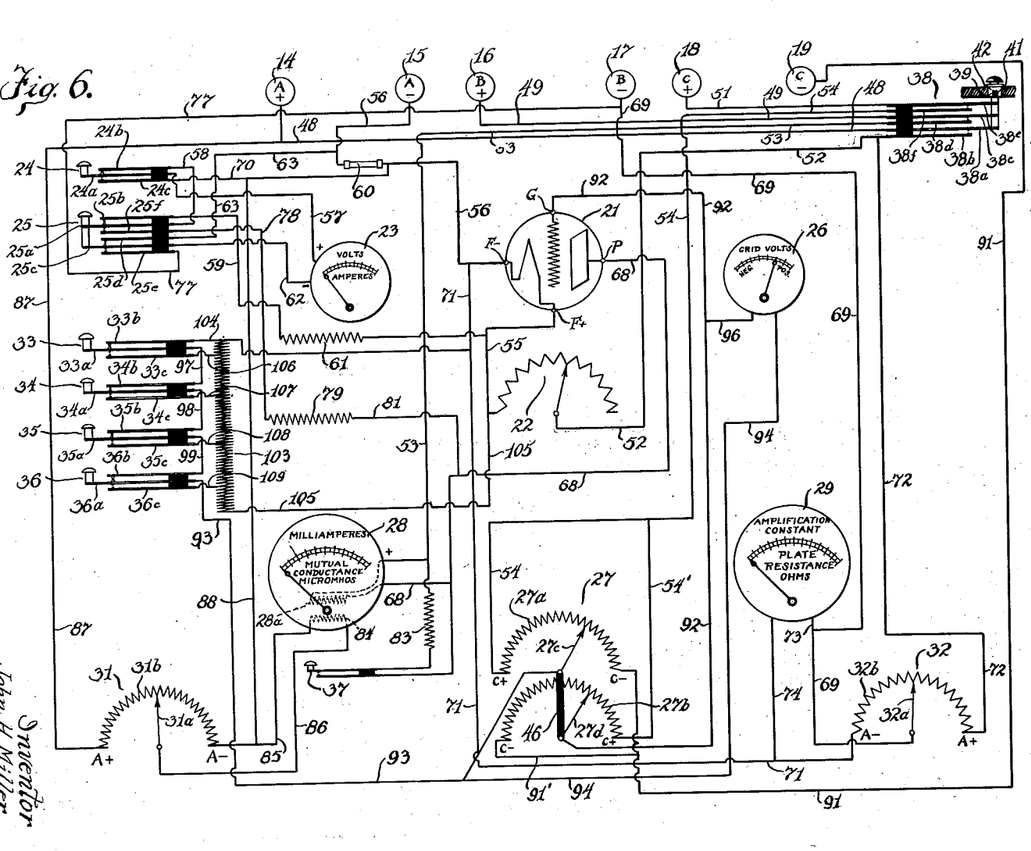

The entire instrument is cut into and out of operation by another button 38 marked "Switch", which button operates a multiple series of spring contacts which control the supply circuits for the filament, plate and grid. As shown in Figure 6, this button has a projecting pin or pins 39 which normally engage in slots 41 in a guide bushing 42 for the button. By pushing the button downwardly and then rotating the same, the pin or pins 39 are revolved onto the solid lower edge of the bushing for holding the button in its depressed position. The button is released to open its multiple spring contacts by rotating the same to bring the pin or pins 39 back into registry with the slots 41.

Figure 1:
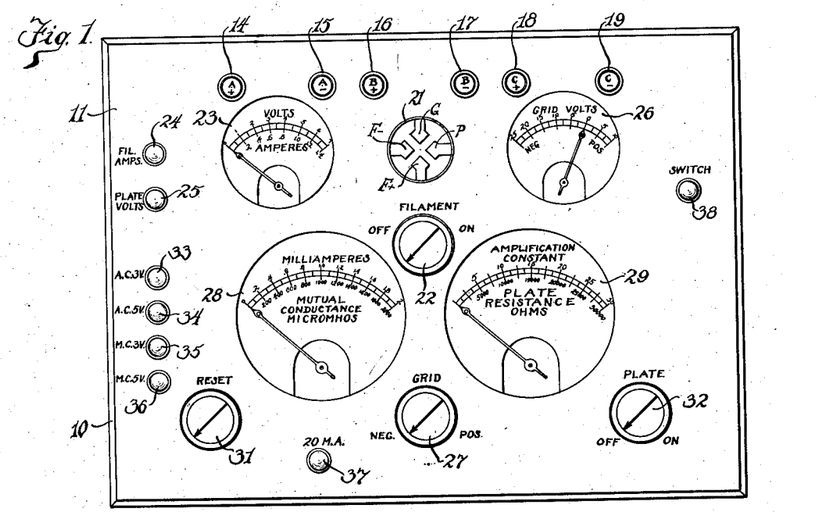
Figure 1 is a top plan view of the complete instrument.
Figure 2:
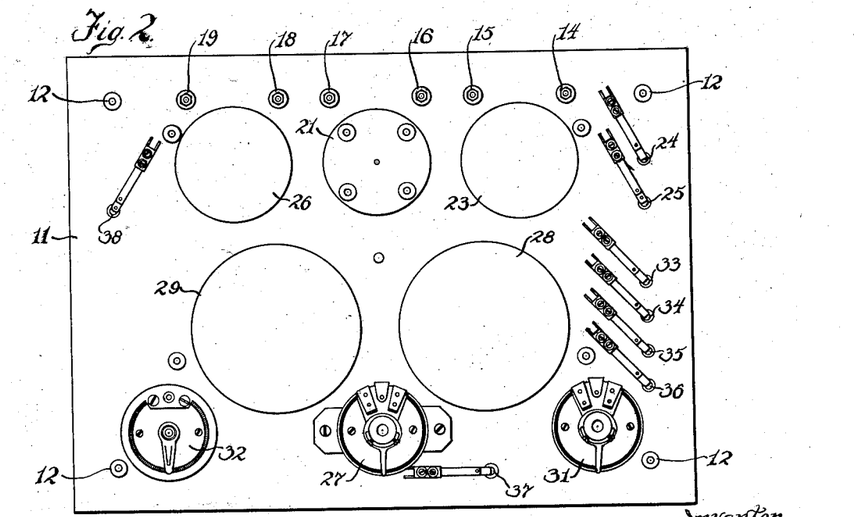
Figure 2 is a bottom plan view of the upper panel, this view illustrating the underside of the panel when it is removed from the cabinet.
Figure 3:
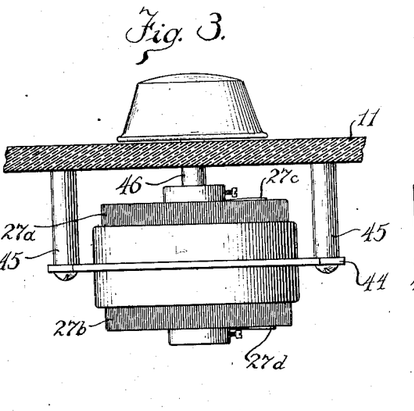
Figure 3 is a fragmentary sectional view through the panel on an enlarged scale for illustrating the double potentiometer in side elevation.
Figure 4:
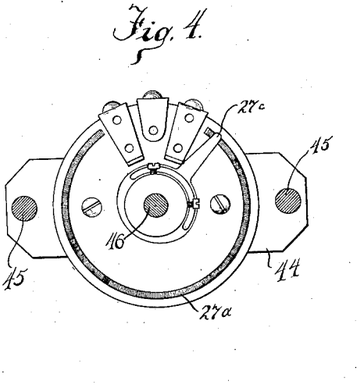
Figure 4 is a bottom plan view of this potentiometer.

The double potentiometer unit 27 is illustrated in Figures 3 and 4. Two potentiometers 27$^a$ and 27$^b$ are secured upon opposite sides of a mounting plate 44 with the contacting sides of the potentiometers facing upwardly and downwardly on this plate. This plate is supported on posts 45 secured to the underside of the panel 11. The operating shaft 46 of the potentiometer carries an upper wiper arm 27$^c$ which bears against the turns of the potentiometer wire of the upper potentiometer, and this shaft also carries a lower wiper arm 27$^d$ which bears against the turns of the lower potentiometer. The connections between these two potentiometer windings will be described in the description of the circuit connections.

Figures 5, 7:
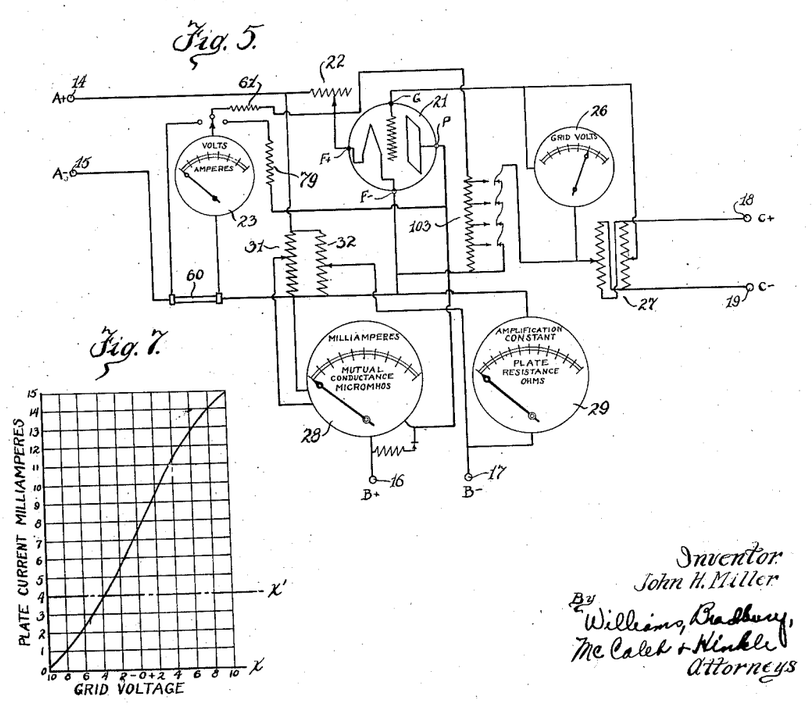
Figures 5 and 6 are circuit diagrams illustrating the connections between the several elements of the instrument.
Figure 7 is a graph of a typical tube.

In Figures 5 and 6 I have shown two circuit diagrams of this instrument. Figure 5 is a simplified circuit diagram of the filament, plate and grid circuits, intended to show with greater clarity the general relationship of these circuits. Figure 6 is a more elaborate circuit diagram illustrating all of the push button switches, etc.

Referring now to the circuit diagram of Figure 6, the supply circuits for the filament supply, plate supply and grid bias are all controlled by the multiple switch 38. Extending from each of the plus supply terminals 14, 16 and 18 respectively are wires 48, 49 and 51 which lead to contact springs 38$^a$, 38$^c$ and 38$^e$ respectively. The cooperating contact springs 38$^b$, 38$^d$ and 38$^f$ connect to wires 52, 53 and 54 respectively. The pressing of the push button of this multiple switch 38 effects contact between the pairs of springs 38$^a$ and 38$^b$, the springs 38$^c$ and 38$^d$, and the springs 38$^e$ and 38$^f$. The wires 52, 53 and 54 connect to circuits which I shall now trace in the following order,—filament, plate and grid.

Tracing the filament circuit, the wire 52 extends to one terminal of the filament rheostat 22, the other terminal of the rheostat connecting through wire 55 to the contact terminal F+ of the tube socket. From the other contact terminal F—, the wire 56 leads to the negative filament supply terminal 15.

The meter 23 is normally included in the following circuit for indicating filament voltage; a wire 57 leads from the positive terminal of this meter to the center contact spring 24$^a$ of the push button switch 24. This contact spring is normally in contact with the upper contact spring 24$^b$ from which the circuit continues through wire 58 to the contact spring 25$^a$ of the adjacent push button switch 25.

This contact spring 25$^a$ is normally in engagement with the contact spring 25$^b$ and hence the circuit is continued through wire 59 which leads from this contact spring 25$^b$ back to the wire 55 which connects the filament rheostat 22 to the contact terminal F+ of the tube socket. Thus, the positive side of the adjusted potential applied to the tube filament through the rheostat 22 is effective on the positive terminal of the meter 23 through the wire 59 and circuit just traced. A resistance 61 is included in the wire 59. When the meter 23 is indicating adjusted filament potential, this potential is applied to the meter through wire 59 and resistance 61. This resistance is calibrated so that the meter will indicate the proper filament potential applied to the tube.

The negative terminal of the meter 23 extends to wire 62 which connects to contact spring 25ᶜ of the push button switch 25. This contact spring is normally in engagement with the contact spring 25ᵈ from whence the circuit extends through wire 63 which connects directly to the negative filament supply terminal 15 or connects to the wire 56 which leads to this supply terminal.

A resistance 60 of predetermined value is interposed in the wire 56 which leads from the negative contact terminal of the socket to the negative supply terminal 15, this resistance thus passing all of the adjusted filament current. The voltage drop across this resistance 60 is a measure of the filament current flow through the resistance. When it is desired to have the meter 23 indicate the filament amperage it is connected across this resistance 60 to indicate this voltage drop. This is accomplished by pressing the push button switch 24 which places the contact spring 24ᵃ in engagement with the lower contact spring 24ᶜ. The positive terminal of the meter 23 is then connected through wires 57 and 70 to that end of the resistance 60 which connects to negative filament contact F— of the socket. The negative terminal of the meter 23 remains connected through wires 62 and 63 with the wire 56, it being noted, however, that the connection between wires 63 and 56 occurs at the other end of the resistance 60. Hence, the meter is shunted directly across the resistance 60 and indicates the filament current flow by this voltage drop.

Referring now to the plate circuit, the wire 53 continues down to the positive terminal of the milliammeter 28, from whence the circuit continues through an armature coil 28ᵃ or other coil, the flow through which is measured directly on the dial of the meter. From the negative terminal of the meter a wire 68 extends up and connects to the contact terminal P of the tube socket 21. This results in a positive potential being applied to the plate of the tube when the multiple switch 38 is closed, the milliammeter 28 being included in this positive side of the plate circuit for indicating plate circuit flow.

From the negative plate supply terminal 17, a wire 69 extends down and connects to the wiper arm 32ᵃ of the "plate" potentiometer 32. One end of the potentiometer winding 32ᵇ of this plate potentiometer connects through wire 71 with the negative filament supply wire 56 which leads to the F— contact terminal of the tube socket. Thus, through this side of the potentiometer winding, the negative side of the plate circuit is continued up to the negative side of the filament supply circuit. The other end of the filament winding 32ᵇ is connected through wire 72 which connects to the wire 52, constituting the positive side of the filament supply circuit for the tube socket. Thus, the voltage of the A battery or source of filament supply is connected directly across the ends of the potentiometer winding 32ᵇ, and hence by moving the wiper arm 32ᵃ, the plate supply voltage effective on the plate terminal P of the tube socket, can be increased or decreased through shifting to different points of the potentiometer winding 32ᵇ.

The meter 29 has one terminal connected to the wiper arm 32ᵃ of this plate potentiometer through wire 69 and wire 73. The other terminal of this meter is connected through wire 74 to the negative end of the potentiometer winding 32ᵇ. This meter 29 is fundamentally a volt meter and indicates the potential drop across that portion of the potentiometer winding 32ᵇ included between the negative end which connects to the wire 71 and the point of contact of the wiper arm 32ᵃ.

As previously stated, the meter 23 is also effective to indicate the plate potential by depressing the push button switch 25. The following circuit is thereupon established through the meter 23. A wire 77 extends from the negative plate supply terminal 17 to the contact spring 25ᵉ of the push button switch 25. When this switch is depressed this contact spring 25ᵉ is connected to contact spring 25ᶜ which connects through wire 62 directly to the negative terminal of the meter 23. As previously described, the positive terminal of this meter is normally connected to wire 58 through wire 57 and contact springs 24ᵃ and 24ᵇ. This wire 58 connects to contact spring 25ᵃ of the lower push button switch, and when this switch is pressed this contact spring 25ᵃ is connected to contact spring 25ᶠ which in turn connects to wire 78. This wire connects to one end of the calibrated resistance 79, the other end of which connects through wire 81 with the wire 68 which leads to the positive plate contact P of the tube socket. The resistance 79 is calibrated so that the greater portion of the plate voltage drop will occur across this resistance and the winding of the meter 23 will bear a definite relationship to this resistance 79 for indicating the remaining voltage in terms of plate circuit potential.

The milliammeter 28 is designed and calibrated for indicating relatively small changes in plate current over a wide scale deflection. In the preferred construction shown, this milliammeter has one scale calibrated from zero to two milliamperes on which the milliammeter gives its normal reading. It should be noted that in its normal use this milliammeter is intended to indicate change in plate current flow, rather than the total plate current flow, and hence this zero to two scale enables these changes in plate current flow to be read with extreme accuracy over a wide scale deflection. Where the instrument is used in the plotting of characteristic curves of tubes, or in other situations where the plate current indication will exceed this two milliampere maximum reading, the maximum scale reading can be raised to some higher point such as twenty milliamperes—by connecting the shunt 83 across the terminals of the milliammeter. This is performed by pressing the push button switch 37. The face of this milliammeter bears other scale indicia reading from zero to twenty from which the readings are taken when this push button switch is depressed.

This milliammeter also embodies a bucking coil 84 or some equivalent circuit connection for establishing what might be termed a counter-electromotive force in the meter for cancelling or nullifying the effect of a normal plate circuit flow in the winding $28^a$ to restore the pointer of this milliammeter to a zero reading position. The purpose of this bucking coil will be more apparent in the following description of the operation of the instrument. Suffice it to say now that one end of this bucking coil is connected through wire 85 to the negative end of the winding $31^b$ of the "reset" potentiometer 31. The other terminal of this bucking coil 84 is connected through wire 86 with the wiper arm $31^a$ of this re-set potentiometer 31. This potentiometer winding $31^b$ is shunted directly across the filament supply circuit through wires 87 and 88. The wire 87 leads from the positive end of the potentiometer winding and connects to the positive filament supply terminal 14. The wire 88 leads from the negative end of the potentiometer winding $31^b$ and connects to the negative filament supply terminal 15 through wires 70 and 56. With this bucking coil 84 connected as shown it will be apparent that it will have a potential on its terminals corresponding to the voltage drop between the negative end of the potentiometer winding and the wiper arm $31^a$. This potential, can of course, be varied from zero voltage to approximately six volts (or the filament supply voltage) by shifting the wiper arm $31^a$ along the potentiometer winding $31^b$. The direction of the current induced in this bucking coil 84 is such as to establish a bucking action for nullifying the normal indication established on the scale of this meter by the plate circuit flow. Thus, by the operation of this reset potentiometer the proper current flow can be set up in the bucking coil 84 to re-set the pointer of the milliammeter 28 exactly to zero.

I shall now trace out the grid circuit of the instrument. The wire 54, on which is impressed the positive grid potential when the multiple switch 38 is closed, leads down to the double potentiometer 27 where this wire branches, one end connecting to the positive end of one potentiometer winding $27^a$, and the other end or branch 54' connecting to the positive end of the other potentiometer winding $27^b$. From the negative grid supply terminal 19, a wire 91 leads down to the double potentiometer 27, this wire also branching, having one end connecting to the negative end of the potentiometer winding $27^a$ and the other branch 91' connecting to the negative end of the other potentiometer winding $27^b$. The wiper arm $27^d$ which contacts with the winding $27^b$ connects through wire 92 with the grid terminal contact G of the tube socket 21. The other wiper arm $27^c$, which engages with the potentiometer winding $27^a$ connects through wire 93 which leads over to the bank of push buttons and makes connection with the central contact spring $36^a$ of the push button switch 36. A wire 94 extends back from this wire 93 and connects to one terminal of the grid volt meter 26. The other terminal of this grid volt meter is connected through wire 96 with the wire 92 which leads to the grid contact terminal G of the tube socket 21. As previously stated, this grid volt meter is operative to indicate positive or negative grid potential on either side of zero.

Referring again to the bank of push button switches 33 to 36 inclusive, the central contact of each switch is connected to the upper spring contact of the next succeeding switch by wires 97, 98 and 99. That is to say, the contact spring $33^a$ of the switch 33 is connected through wire 97 to the upper contact spring $34^b$ of the switch 34; the central contact spring $34^a$ of this switch is connected through wire 98 to the upper contact spring $35^b$ of the switch 35; and the central contact spring $35^a$ of this switch is connected through wire 99 to the upper contact spring $36^b$ of the switch 36. As before described, the wire 93 connects to the central contact spring $36^a$ of the switch 36 and hence with all of these push button switches in their normal positions, this circuit through the wire 93 will be continued up through the central and upper contact springs of each succeeding switch up to the contact spring $33^b$ of the switch 33. A wire 104 connects this upper contact spring to the wire 71 which leads to the negative filament terminal F— of the tube socket. Thus, with all of the push buttons 33 to 36 inclusive in their normal or raised positions, the wire 93 has connection with the negative side of the tube filament. Hence, a normal grid circuit is established from the source of grid bias through the double potentiometer to the grid, from the grid to the filament in the tube, and from the negative side of the filament back through the double potentiometer to the C-battery or source of grid bias. The double potentiometer serves to enable either a positive or negative potential of this C-battery to be placed upon the grid, and by cross connecting the two windings $27^a$ and $27^b$ of this potentiometer and having one wiper arm 27$^d$ approach the positive end of its winding while the other wiper arm 27$^c$ is approaching the negative end of its winding, the entire voltage of the C-battery may be impressed in either a negative or positive direction on the grid, whereby a wide range of grid potential variation can be obtained from a relatively small C-battery. The shaft 46 which connects both wiper arms 27$^c$ and 27$^d$ is insulated from one or both wiper arms or has an insulating section interposed therein.

Cooperating with the push button switches 33 to 36 inclusive is a high resistance shunt 103 which has its extremities connected directly across the filament of the tube. Thus one end of this resistance winding 103 is connected through wire 104 with the wire 71 which connects to the negative filament contact F— of the tube socket; and the other end of this resistance winding 103 is connected through wire 105 with the wire 55 which leads to the positive filament contact F+ of the tube socket. The lower contact springs 33$^c$, 34$^c$, 35$^c$ and 36$^c$ are each connected to different points of this resistance shunt 103 through wires 106 to 109 inclusive. With the push buttons all raised, the grid circuit continuing through the wire 93 is connected directly to the negative side of the filament circuit.

Inasmuch as the resistance shunt 103 is connected directly across the filament terminals of the tube socket, it will always have a definite known voltage impressed on its ends corresponding to the adjusted filament voltage, which voltage will be indicated on the meter 23. Thus, by operating any one of the push buttons 33 to 36 inclusive, the potential effective on the grid will be varied by an amount equal to the voltage drop across the intercepted resistance of the shunt 103. That is to say, each of the wires 106 to 109 inclusive tap into the resistance shunt 103 at pre-determined points spaced with reference to the then existing voltage impressed on the resistance shunt to secure pre-determined voltage drops between these taps and the ends of the shunt. The depressing of one of the push button switches 33 to 36 inclusive breaks the continuous circuit between the wire 93 and the negative side of the tube filament and places this wire 93 in connection with the resistance shunt 103 at one of these taps. Thus the effective grid potential is varied by the voltage drop between this tap and the end or ends of the shunt. These latter circuit connections and their functions will be more apparent from the description of the operation of the instrument.

I shall now describe the method of obtaining the mutual conductance of a tube. A source of filament supply, such as a six volt A-battery is connected to the filament supply terminals 14 and 15; a source of plate supply or a B-battery of the desired potential is connected to the plate supply terminals 16 and 17; and a source of grid bias preferably a C-battery of approximately twenty-two and one-half volts, is connected to the grid supply terminals 18 and 19. All control knobs on the face of the panel are turned to the "off" position, or in the case of the controlling knob of the grid potentiometer, to the negative position. The tube to be tested is inserted in the socket 21 and the filament rheostat is adjusted until the filament voltage is indicated on the meter 23 as proper for that type of tube, i. e. either five volts or three volts, or whatever voltage is proper for the tube. The grid volt meter 26 is then adjusted by the grid potentiometer 27 to indicate a point of grid bias at which it is desired to take the several characteristics.

The steps thus far taken, including the lighting of the filament and the setting of a grid potential, (either zero, or positive or negative a definite amount) have established a plate circuit flow between plate and filament which plate circuit flow is indicated on the milliammeter 28 in milliamperes. The next step is to now return this milliammeter 28 to a zero reading. This is performed by the manipulation of a "reset" potentiometer 31 which picks off a certain amount of energy from the A-battery through the winding 31$^b$ and wiper 31$^a$ and applies this A-battery energy to the bucking coil 84 in such direction as to oppose and overcome the plate circuit reading established by the coil 28$^a$. The reset potentiometer is adjusted so that this milliammeter is brought back to exact zero. Thereupon, the push button switch 35 or the next lower switch 36 is pressed depending upon whether the tube is a three volt tube or a five volt tube. Assuming that a five volt tube is being tested, the pressing of the push button switch 36 will place the wire 93 in connection with the tap 109 whereby the grid potential will be varied by a pre-determined definite amount corresponding to the drop across that portion of the shunt 103 between the tap 109 and the wire 105. Upon the basis of calibration which I find preferable and which I have shown in the present embodiment of instrument, this produces a shift in the grid potential equal to one volt positive. This shift in grid potential will result in a change in plate current flow (from the zero or reset position) which change in plate current flow is indicated directly on the milliammeter 28. This indication will be in milliamperes on one scale and in micromhos on another scale of this same instrument. From the scale of michromhos, the mutual conductance of the tube is read directly.

The manner in which this direct reading is obtained will probably be clarified by again considering the equation for mutual conductance, $$\text{Mutual conductance} = \frac{\text{Change in plate current}}{\text{Change in grid voltage}}$$

By changing the grid potential one volt, the denominator of this equation is unity. Hence, the reading in change of plate current as given on the milliammeter 28 will correspond exactly to the mutual conductance. For example assuming that this unit change in grid potential produced a change of .6 milliamperes, this .6 milliamperes is one measure of the mutual conductance. However, inasmuch as this change in plate current reading produced by a unit volt change in grid potential bears a fixed relation to the conductivity of the tube in mhos, the milliammeter scale can also be calibrated in mhos. The mho is too large a unit for the values employed and accordingly this is divided into micromhos. Thus .6 milliampere change in plate current flow will correspond exactly to 600 micromhos of mutual conductance, and hence the mutual conductance can be read directly from the scale of micromhos.

In the foregoing operation, the act of resetting the plate milliammeter to zero reading by passing A-battery energy through the bucking coil 84 under the control of the reset potentiometer 31 has the same effect as raising the horizontal axis of the characteristic curve of the tube. This can best be understood by considering the typical curve shown in Figure 7. Before the plate milliammeter has been reset to zero, the abscissa or zero line of the curve corresponds exactly to the horizontal axis X. Assuming that it is desired to take the mutual conductance of the tube with a grid bias of 4 volts negative and with 90 volts on the plate, the normal plate current will approximate 4 milliamperes (this being approximately true of the ordinary 5 volt radio receiving tube). In resetting the plate milliammeter to zero we are in effect raising the zero line from the axis X to the axis X', corresponding to this plate current reading, and obliterating or disregarding the entire lower part of the curve below this second horizontal axis X'. We are in effect also raising the scale readings of plate milliamperes along the Y axis so that the zero reading will coincide with the upper horizontal axis X'. Thereupon, any change in grid potential, such as is produced by pressing the push buttons 35 or 36 (which increases the grid potential in a positive direction) will measure the change in plate current along that part of the curve above the upper horizontal axis X' the same as though this were the true zero line. It will be observed that with the foregoing grid and plate values the upper horizontal axis X' will fall on the straight part of the curve and measurements thereafter made along the curve will fall on this straight portion.

I shall describe the method of determining the plate resistance of the tube. The plate milliammeter having been reset to zero by the operation of the reset potentiometer, as above described, and the push button switches 33 to 36 inclusive being in their raised positions, the plate potentiometer 32 is now rotated until the milliammeter 28 shows an increase of .2 milliamperes on its scale. This scale reading of .2 milliamperes is given some characteristic marking such as a red line, or other indicia so that this scale marking will stand out from the rest of the scale. The plate resistance is now indicated directly on one scale of the meter 29, which scale is calibrated directly in ohms. It will be observed that at this time the meter 29 is indicating the plate voltage increase which has been established in the potentiometer winding $32^b$ between the negative end and the wiper arm $32^a$, corresponding to the increase of voltage necessary to increase the plate current flow the .2 milliamperes indicated above.

In the equation, $$\text{Plate resistance} = \frac{\text{Change in plate voltage}}{\text{Change in plate current}}$$

We thus have .2 milliamperes as the denominator or change in plate current and for the numerator we have the aforesaid voltage increase between the negative end of the potentiometer winding $32^b$ and the wiper arm $32^a$. The meter 29 is calibrated with reference to this .2 milliampere change in plate current flow to indicate the change in plate voltage directly in ohms of plate resistance. This scale of plate resistance ranges from zero to 30,000 ohms providing ample range for the average tube.

I shall describe the manner of determining the amplification constant of a tube. The plate potentiometer 32 having been returned to zero or off position, the proper push button switch 33 or 34 is pressed depending upon whether the tube is a three volt tube or a five volt tube. Assuming that it is the latter tube, pressing the push button switch 34 will shift the grid potential by .2 volts (by tapping the wire 93 into the resistance shunt 103, as before described). The plate milliammeter 28 is again reset to zero by operation of the reset potentiometer 31 with the push button 34 held down. Upon releasing this push button, the plate milliammeter will indicate back of zero, and it is now returned to zero by operation of the plate potentiometer 32 which changes the plate voltage. This operation of the plate potentiometer 32 will establish a reading on the meter 29 which will indicate the amount of plate voltage change and thereby indicate on its second scale the amplification constant of the tube directly in the unit employed for representing this amplification constant.

Referring again to the equation for this characteristic, $$\text{Amplification constant} = \frac{\text{Change in plate voltage}}{\text{Change in grid voltage}}$$

It will be apparent that the change in grid voltage amounted to .2 volts by the pressing of the push button switch 34. This produced a change in plate current flow which is used as a factor in determining the change in plate voltage which would correspond to this change in grid voltage. This is obtained by resetting the plate milliammeter 28 to zero and then causing this change in plate current flow to indicate back of zero by releasing the push button switch 34. Thereupon, the act of bringing the pointer of the milliammeter back to zero will involve a change in plate voltage corresponding to the change in conditions created by the change in grid voltage. This change in plate voltage necessary to bring the plate milliammeter back to zero reading is indicated directly on the meter 29 in terms of amplification constant.

For ascertaining the filament amperage drawn by a tube at any point in its operation, the push button switch 24 is depressed, whereupon the meter 23 indicates this filament amperage directly on its scale which is provided with a set of scale readings corresponding to this current flow. For determining the plate voltage impressed on a tube, the push button switch 25 is depressed, which results in the meter 23 indicating this plate voltage on a third set of scale readings for indicating the plate voltage directly.

Where it is desired to plot characteristic curves of a tube this can be readily performed in the present instrument by taking the different values of plate current for different values of grid voltage. The push button shunt 37, by raising the scale readings of the plate milliammeter 28 enables all of these plate current values to be read on this milliammeter.

From the very nature of my invention, it will be understood that it can be practiced by different arrangements of apparatus and by different steps, performed either manually or automatically, and I intend that the appended claims shall cover all of such variations, not disclosed by the prior art.

I claim:

1. In a thermionic valve testing instrument, the combination of a case, a tube socket carried by said case, filament, plate and grid circuits in said case connecting to said tube socket, a rheostat for controlling said filament circuit, a milliammeter carried by said case and included in said plate circuit, a scale on said milliammeter for indicating mutual inductace in micromhos, means for varying the grid potential a pre-determined amount, means for varying the plate potential, a meter connected to said plate potential varying means, and scales on said latter meter for indicating plate resistance directly in ohms and amplification constant.

2. In a thermionic valve testing instrument, the combination of a case comprising a tube socket, a milliammeter and a second meter, filament, plate and grid circuits in said case connected to said tube socket and to said meters, means carried by said case for varying the grid potential in said grid circuit a pre-determined amount, a scale on said milliammeter for indicating the mutual conductance of the tube directly in micromhos, and scales on said second meter for indicating the amplification constant of the tube and for indicating the plate resistance of the tube directly in ohms.

3. In radio tube testing apparatus, the combination of a case comprising a tube socket, a filament circuit connected to the filament terminals of said tube socket, a rheostat in said filament circuit, a plate circuit connected to the plate terminal of said socket, a first meter in said plate circuit, scale divisions on said first meter indicating the mutual conductance of the tube directly in micromhos, a grid circuit connected to the grid terminal of said tube socket, and means for varying the grid potential in said grid circuit an amount pre-determined to indicate the mutual conductance on said meter.

4. In an instrument for indicating the mutual conductance of a radio tube, the combination of filament, plate and grid circuits in said instrument, means for varying the grid potential a pre-determined amount, and means calibrated with respect to said grid potential change and responsive to the variation in plate current flow for indicating the mutual conductance of the tube as a direct scale reading.

5. In an instrument for measuring the mutual conductance of a radio tube, the combination of means for establishing a current flow through the tube filament, means for establishing a plate current flow through the tube, means for varying a grid potential of said tube a pre-determined amount, and a meter connected to said plate circuit for indicating the mutual conductance of the tube directly in micromhos upon the basis of the aforesaid change in grid voltage.

6. In a radio tube testing instrument, the combination of a case comprising a tube socket, filament, plate and grid circuits connecting to said tube socket, a rheostat connected to control the filament circuit, a milliammeter in said plate circuit, a potentiometer connected in said grid circuit, and switch means for varying the grid potential a pre-determined amount, said milliammeter having a scale calibrated in direct relation to the aforesaid change in grid voltage for indicating the mutual conductance directly in micromhos.

7. In a radio tube testing instrument, the combination of a case comprising a tube socket, filament, plate and grid circuits connecting to said socket, a rheostat in said filament circuit, a plate milliammeter in said plate circuit, a grid volt meter in said grid circuit, means for re-setting said plate milliammeter to zero in opposition to a normal plate current flow, means connected to said grid circuit for varying the grid potential a pre-determined amount, and a scale on said milliammeter calibrated with reference to the aforesaid change in grid voltage to indicate the mutual conductance of the tube by direct scale reading.

8. In a radio tube testing instrument, the combination of a case comprising a tube socket, filament, plate and grid circuits connected to said sockets, a meter connected in said plate circuit, said meter having a bucking coil therein, potentiometer means for taking electrical energy from said filament circuit and passing it through said bucking coil to cancel the effect of the normal plate circuit flow and return this meter to zero, means for varying the grid potential a pre-determined amount, and scale readings on said meter calibrated with reference to the aforesaid change in grid potential for indicating the mutual conductance of the tube as a direct scale reading.

9. In a radio tube testing instrument, the combination of a case comprising a tube socket, filament, plate and grid circuits connecting to said socket, a meter in said plate circuit, means for restoring said meter to zero reading in opposition to an existing plate circuit flow, means for changing the grid potential a pre-determined amount, and means associated with said meter for indicating the mutual conductance of the tube upon the basis of the aforesaid change in grid potential.

10. In a radio tube testing instrument, the combination of a tube socket, filament, plate and grid circuits connecting to said tube socket, a meter connected in said plate circuit, means for restoring said meter to zero indication, means for varying the grid potential a pre-determined amount, and scale indicia on said meter calibrated to indicate a characteristic of the tube pursuant to the change in grid potential.

11. In a radio tube testing instrument, the combination of a case comprising a tube socket, filament, plate and grid circuits connecting to said tube socket, a milliammeter connected in said plate circuit, said milliammeter having a bucking coil therein, a re-set potentiometer shunted across said filament circuit, circuit connections between said re-set potentiometer and said bucking coil and passing electrical current from the filament circuit through said bucking coil to re-set said milliammeter to zero reading, push button switch means included in said grid circuit and effective to vary the grid potential a pre-determined amount, and scale indicia on said milliammeter calibrated with reference to the aforesaid change in grid potential for indicating the mutual conductance of the two directly in micromhos.

12. In a radio tube testing instrument, the combination of a tube socket, filament, plate and grid circuits connected to said socket, a milliammeter in said plate circuit, means for varying the plate voltage impressed on the tube to increase the plate current a pre-determined amount as indicated on said milliammeter, and a meter responsive to said change in plate voltage and calibrated to indicate directly in ohms the plate resistance of the tube.

13. In a radio tube testing instrument, the combination of a tube socket, filament, plate and grid circuits connected to said socket, a milliammeter connected to indicate plate current, means for varying the plate potential to produce a predetermined change in plate current as indicated on said milliammeter, and a second meter connected to said plate potential varying means and calibrated to indicate plate resistance directly thereon on the basis of the aforesaid change in plate current.

14. In radio tube testing instruments, the combination of a tube socket, filament, plate and grid circuits connecting to said socket, a milliammeter in said plate circuit, means for re-setting said milliammeter to zero, means for increasing plate potential until the plate current flow is increased a predetermined amount as indicated on said milliammeter and a volt meter connected to said plate potential varying means and calibrated with reference to the predetermined change in plate potential for indicating directly thereon the plate resistance of the tube.

15. In a radio tube testing instrument, the combination of a tube socket, filament, plate and grid circuits connecting to said socket, a milliammeter in said plate circuit for indicating plate current, means in said grid circuit for shifting grid potential a pre-determined amount, means for re-setting said plate milliammeter to zero after the shift of said grid potential whereby said milliammeter will indicate back of zero when said grid potential is restored to its former value, means for varying plate potential in said plate circuit to bring said milliammeter back to zero reading, and a meter connected to said plate potential varying means and responsive to the change in plate potential and calibrated for indicating directly the amplification constant of the tube.

16. In a radio tube testing instrument, the combination of a tube socket, filament, plate and grid circuits connecting to said socket, a milliammeter in said plate circuit for indicating plate current flow, means in said grid circuit for shifting the grid potential a predetermined amount, means for setting off on one side of the zero reading of said milliammeter the differential plate current resulting from the change in grid potential, means in said plate circuit for varying the plate potential to bring said milliammeter back to reading, and a meter connected to respond to said change in plate potential and calibrated with reference to said plate current change and said grid potential change for indicating thereon the amplification constant of the tube.

17. In radio tube testing apparatus, the combination of tube mounting means, filament, plate and grid circuits connected to said tube mounting means, a milliammeter in said plate circuit for indicating plate current flow, push button switch means connected to said grid circuit and said filament circuit for shifting the grid potential a predetermined amount, a re-set potentiometer connected to said filament circuit, a bucking coil in said milliammeter connected to said re-set potentiometer, said re-set potentiometer transferring electrical energy from said filament circuit to said bucking coil for re-setting said plate milliammeter to zero after the shift of grid potential whereby said milliammeter will indicate on the other side of zero when said grid potential is restored to its former value, a plate potentiometer connected to said plate circuit and said filament circuit for varying the plate potential to bring said milliammeter back to zero reading, and a volt meter connected to said plate potentiometer and responsive to the change in plate voltage in said plate circuit, said volt meter having a scale calibrated with reference to the aforesaid changes in terms of amplification constant of the tube.

18. In a radio tube testing instrument, the combination of tube mounting means, filament, plate and grid circuits connected to said tube mounting means, a meter connected across said filament circuit for normally indicating filament voltage, switch means for connecting said meter to indicate filament amperage, and additional switch means for connecting said meter to said plate circuit for indicating plate voltage.

19. In radio tube testing apparatus, the combination of tube mounting means, filament and plate circuits connecting to said mounting means, a meter in said plate circuit, said meter comprising a bucking coil, and means for taking electrical energy from said filament circuit and passing it through said bucking coil for re-setting said meter to zero.

20. In radio tube testing apparatus, the combination of tube mounting means, filament and plate circuits connecting to said tube mounting means, means connecting to said filament and plate circuits for varying the plate potential in said plate circuit, and a meter connected to be responsive to the change in plate potential and calibrated in a characteristic of the tube.

21. In radio tube testing apparatus, the combination of tube mounting means, filament and grid circuits connected to said tube mounting means, two potentiometer windings, wiper arms for each of said windings connected together for conjoint movement, one of said wiper arms connecting to the grid terminal of said tube mounting means, the other of said wiper arms connecting to the filament circuit, and conductors adapted to have connection to a source of C-battery bias and connected to the opposite ends of said tube potentiometer windings, whereby the operation of said two wiper arms will increase the negative potential on the grid element of the tube while increasing the positive potential transmitted to said filament circuit and vice versa.

22. In a testing instrument of the class described, the combination of filament, plate and grid circuits, means for varying the bias in said grid circuit, a milliammeter in said plate circuit, and means nullifying the effect of a plate current flow in said plate circuit to reset said milliammeter to zero.

23. In a testing instrument of the class described, the combination of a plate circuit for connection to the thermionic valve being tested, a meter connected to said plate circuit, and means for resetting said meter to zero, comprising means for nullifying the effect of the current flow of said plate circuit in said meter.

24. In testing apparatus of the class described, a meter for indicating plate current flow, and means for resetting said meter to zero reading in opposition to a plate circuit flow, comprising a bucking coil in said meter.

25. In testing apparatus of the class described, a meter connected to the plate circuit, and electro magnetic means for resetting said meter to a predetermined indication.

26. In testing apparatus of the class described, the combination of filament, plate and grid circuits, means for varying the bias in said grid circuit, a milliammeter connected to said plate circuit, and control means cooperating with said meter having in effect the action of raising the zero line of the characteristic curve of the tube in making tube measurements.

27. In an electrical testing instrument, the combination of means for establishing a flow of current in the plate circuit of a thermionic tube, means for changing the grid potential a predetermined amount, and means responsive to the resultant change in plate current flow for indicating the mutual conductance of the tube.

28. In an electrical testing instrument, the combination of means for establishing a flow of current in the plate circuit of the thermionic tube, means for changing the plate current flow an amount dependent upon a predetermined amount of change in the grid potential, and means calibrated in terms of mutual conductance for measuring the ratio of the resultant change in plate current flow to the change in grid potential.

29. In an electrical testing instrument, the combination of means for establishing flow of current in the plate circuit of the thermionic tube, a measuring instrument for said plate current flow, means for resetting said instrument to a zero reading in opposition to said plate current flow, means for increasing the grid potential a predetermined amount and means for indicating the mutual conductance of the tube upon a scale provided on said instrument and calibrated with reference to said change in grid potential.

30. In an electrical testing instrument, the combination of means for establishing a flow of current in the plate circuit of a thermionic tube, means for changing the plate voltage until the plate current flow is changed a predetermined amount, means responsive to the aforesaid change in plate voltage for indicating the plate resistance of the tube.

31. In an electrical measuring instrument, the combination of means for establishing a flow of current in the plate circuit of a thermionic tube, means for indicating the amount of plate current, means for resetting said latter means to zero in opposition to the plate current flow previously established, means for increasing plate voltage until the plate current flow is increased a predetermined amount as indicated by said indicating means, and means responsive to said change of plate voltage and calibrated with reference to said change in said current for indicating the plate resistance of the tube.

32. In an electrical measuring instrument, the combination of means for establishing a flow of current in the plate circuit of a thermionic tube, a measuring instrument for indicating said normal plate current flow, electrical means for resetting said instrument to a predetermined point in opposition to said normal plate current flow, means for increasing the plate voltage until the plate current flow indicated upon said instrument is increased a predetermined amount, and means responsive to said change in plate voltage for indicating the plate resistance of said tube, said latter means being calibrated with ohms with reference to said predetermined change in plate current flow.

33. In an electrical testing instrument, the combination of means for establishing a current flow in the plate circuit flow in the plate circuit of a thermionic tube, means for changing the grid potential a predetermined amount, an electrical instrument for indicating the resultant change in plate current flow, means for resetting said instrument to a predetermined value without changing the grid potential, means for restoring the grid potential to its former value, thereby causing said instrument to indicate the effect of said change in grid potential, means for increasing the plate voltage to bring said instrument reading back to said predetermined point, and means for measuring the resultant change in plate voltage in terms of the amplification constant of the tube.

34. The method of measuring the mutual conductance of a thermionic tube comprising, energizing said tube, indicating with a meter the plate current in said tube at a predetermined energization, returning said meter to zero indication, changing the value of the electromotive force impressed on one of the electrodes of said tube and indicating the change in current resulting from the change in said electromotive force.

In witness whereof, I hereunto subscribe my name this 4th day of March, 1926.

JOHN H. MILLER.